(12) United States Patent
Piadyk et al.

(10) Patent No.: US 11,908,194 B2
(45) Date of Patent: Feb. 20, 2024

(54) TRACKING SPARSE OBJECTS AND PEOPLE IN LARGE SCALE ENVIRONMENTS

(71) Applicant: New York University, New York, NY (US)

(72) Inventors: Yurii S. Piadyk, Brooklyn, NY (US); Carlos Augusto Dietrich, Porto Alegre (BR); Claudio T Silva, New York, NY (US)

(73) Assignee: New York University, New York, NY (US)

( * ) Notice: Subject to any disclaimer, the term of this patent is extended or adjusted under 35 U.S.C. 154(b) by 160 days.

(21) Appl. No.: 17/203,315

(22) Filed: Mar. 16, 2021

(65) Prior Publication Data

US 2021/0287336 A1 Sep. 16, 2021

Related U.S. Application Data

(60) Provisional application No. 62/990,359, filed on Mar. 16, 2020.

(51) Int. Cl.
*G06V 20/52* (2022.01)
*G06T 3/40* (2006.01)
*G06F 18/25* (2023.01)

(52) U.S. Cl.
CPC .............. *G06V 20/52* (2022.01); *G06F 18/25* (2023.01); *G06T 3/4038* (2013.01)

(58) Field of Classification Search
CPC ......... G06T 3/4038; G06T 2207/10016; G06T 2207/10028; G06T 2207/20084; G06T 2207/30196; G06T 2207/30224; G06T 2207/30228; G06T 7/292; G06K 9/6288; G06V 20/13; G06V 20/52

See application file for complete search history.

(56) References Cited

U.S. PATENT DOCUMENTS

| | | | |
|---|---|---|---|
| 2014/0098195 A1* | 4/2014 | Pace | H04N 13/243 348/47 |
| 2018/0197324 A1* | 7/2018 | Hanamoto | G06T 7/70 |
| 2020/0167959 A1* | 5/2020 | Shen | G08B 13/1963 |
| 2020/0404174 A1* | 12/2020 | Taxbøl | G06T 7/20 |
| 2021/0132465 A1* | 5/2021 | Shabtay | H04N 23/63 |

* cited by examiner

*Primary Examiner* — Chan S Park
*Assistant Examiner* — Daniel C Chang
(74) *Attorney, Agent, or Firm* — John C. Pokotylo; Pokotylo Patent Services (57) ABSTRACT

A modular tracking system is described comprising of the network of independent tracking units optionally accompanied by a LIDAR scanner and/or (one or more) elevated cameras. Tracking units are combining panoramic and zoomed cameras to imitate the working principle of the human eye. Markerless computer vision algorithms are executed directly on the units and provide feedback to motorized mirror placed in front of the zoomed camera to keep tracked objects/people in its field of view. Microphones are used to detect and localize sound events. Inference from different sensor is fused in real time to reconstruct high-level events and full skeleton representation for each participant.

19 Claims, 5 Drawing Sheets

TRACKING SPARSE OBJECTS AND PEOPLE IN LARGE SCALE ENVIRONMENTS

§ 0. RELATED APPLICATION(S)

This application claims the benefit of U.S. Provisional Patent Application Ser. No. 62/990,359 (referred to as "the '359 provisional" and incorporated herein by reference), filed on Mar. 16, 2020, titled "METHOD AND APPARATUS FOR TRACKING OF SPARSE OBJECTS AND PEOPLE IN LARGE SCALE ENVIRONMENTS" and listing Yurii S. PIADYK, Carlos Augusto DIETRICH and Claudio T. SILVA as the inventors. Any references cited in the '359 provisional are also incorporated herein by reference. The present invention is not limited to requirements of the particular embodiments described in the '359 provisional.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

§ 1. BACKGROUND

§ 1.1 Field of the Invention

The example embodiments consistent with the present description concern tracking systems such as, for example, to real-time athlete tracking during sporting events.

§ 1.2 Background Information

For a long time now, tracking of athletes' performance has been of great interest to coaches and spectators alike. Statistical analysis of this information helps coaches to plan strategy and evaluate players. Real-time detection of players and the ball provides deeper insight into the game during real-life sporting events and enhances the viewing experience through display of various statistics such as the speed of the ball or overlay of graphical trails during broadcasting.

A variety of tracking systems is currently available. The ball is typically being tracked using radar technologies and player tracking systems can be categorized as active or passive. Active tracking systems employ various kinds of markers/transceivers embedded into sports apparel (e.g., RFID) and might interfere with athlete's performance. In contrast, passive tracking systems are typically using cameras to passively observe players but lack speed and/or resolution to be able to track the ball or provide representation of the player in high level of details.

Another unmet need is to provide a description of high-level game events which is currently done primarily by hand. This makes such systems very labor intensive and leads to inaccuracies due to human error.

§ 2. SUMMARY OF THE INVENTION

Example embodiments consistent with the present description provide a tracking system that can track a large physical area at high resolution (that is, being able to resolve detailed movement of people and objects, such as that required to compute skeletons), in contrast to existing tracking systems when applied to large scale environments, such as a sports field. Simply putting a camera overviewing the entire field, for example, limits the achieved spatial resolution to the size of the field divided by resolution of the camera. A camera focused (that is, "zoomed") on the object of interest would not have this problem but in this case, the tracked object might leave the field of view of the zoomed camera.

The observation is that objects of interest are sparsely distributed in such large-scale environments, which are also predominantly flat Example embodiments consistent with the present description use this observation to maximize signal-to-noise ratio, which we define as the fraction of pixels corresponding to a player over the total image resolution, and is characterized by the fact that it includes:
  a) devices comprising of a pair of panoramic and at least one zoomed camera, and located at field level for real time tracking of individual objects;
  b) motorized mirror placed in front of the zoomed camera to adjust its field of view if necessary;
  c) secondary shutter installed between the mirror and zoomed camera for speed measurements from a single frame;
  d) one or more optional microphones embedded into each device and synchronized with cameras; and
  e) auxiliary LIDAR and/or at least one camera overviewing the entire field.

Example embodiments consistent with the present invention may also have one or more of the following characteristics:
  i) Algorithms to detect the tracked objects and determine when and how to adjust the position of the mirrors are being executed locally by each of the said devices turning them into standalone independent tracking units.
  ii) Said devices are synchronized with high accuracy and can transfer data via wired or wireless network connection. It is also possible for devices to share their computational resources by delegating some of the computations to stalling devices.
  iii) An orchestrator module comprising of software components for environment reconstruction, data visualization, processing of user input and distribution of computations among devices. It can be executed on a dedicated computer or on one of the said devices.

§ 4. DETAILED DESCRIPTION

Example embodiments consistent with the present description may involve novel methods, apparatus, message formats, and/or data structures for tracking of objects and people in large scale environments. The following description is presented to enable one skilled in the art to make and use the invention, and is provided in the context of particular applications and their requirements. Thus, the following description of embodiments consistent with the present description provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described. What follows is a particular implementation of the invention provided for illustration purposes, without being limiting in any way, for use in sports related context and, in particular, in the context of a sports field containing a number of players and a ball. It is understood that variations of the invention may be used in environments that are unrelated to sports while remaining within the context of the invention.

Figure 1:
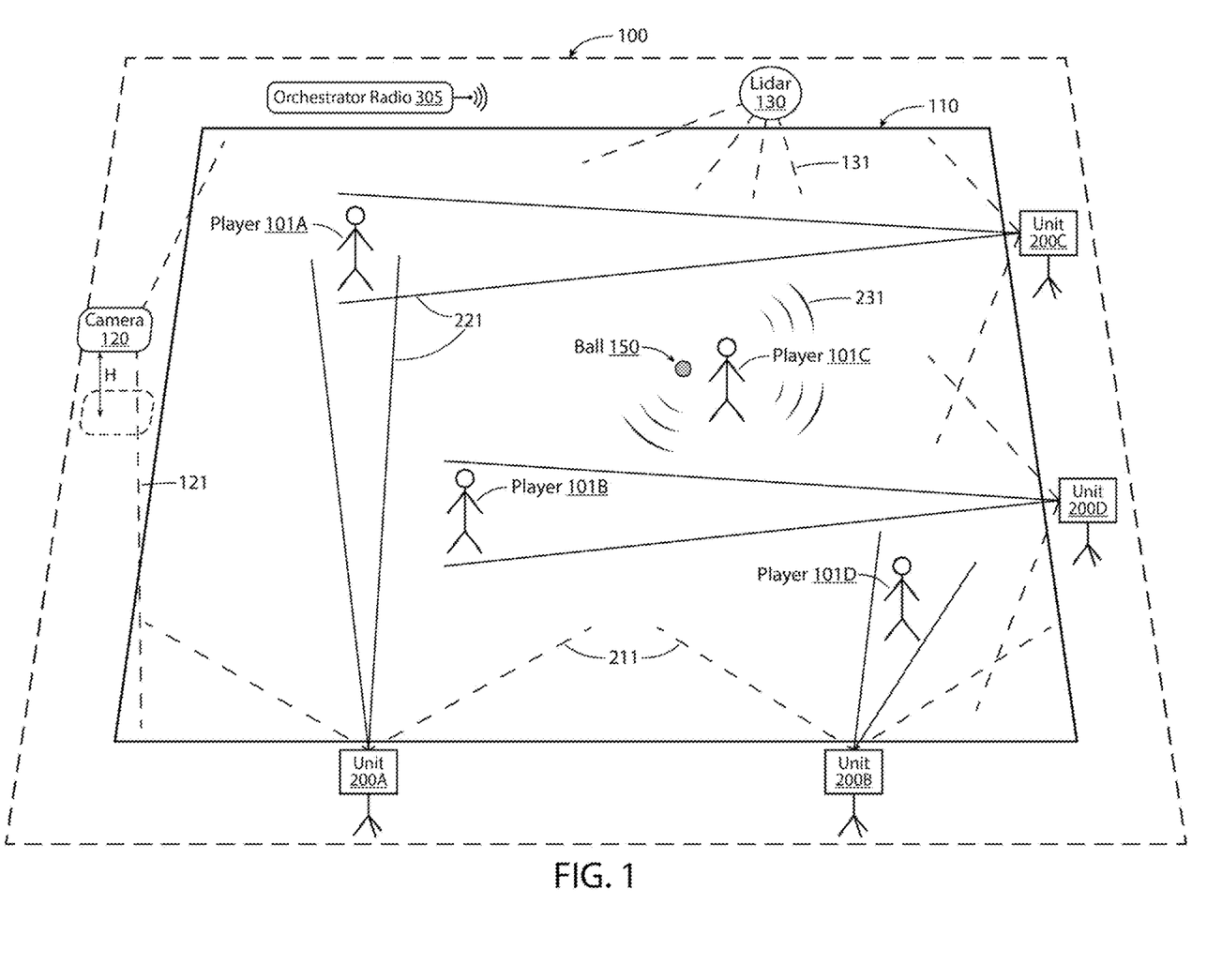
FIG. 1 represents a general plane section illustrating a sports field equipped with the main components of the system.

Referring now to the figures, FIG. 1 shows a flat ground field 100 and players 101A-D that are playing within the game field 110. Components of the example system are placed around the game field 110. Devices comprising of a pair of panoramic and at least one zoomed camera are referred to as tracking units 200A-D. Dashed lines 211 are denoting the field of view of panoramic cameras and solid lines 221 are showing a momentary field of view of zoomed cameras as it might change over time. In some embodiments, the field of view of the panoramic cameras can be greater than 180 degrees to ease the calibration of tracking units. One way of building such a panoramic camera is to combine, and synchronize, several standard cameras into a horizontal array, thus, increasing horizontal field of view while the vertical field of view remains unchanged. Panoramic cameras of the tracking units 200A-D are sufficiently covering the game field 110 to avoid any blind spots. In some example embodiments, the system is complemented with one or more cameras 120 that are elevated above the field 100 at height H so that their field of view 121 (45 degrees or greater, horizontally) includes the entire game field 110 and players do not occlude each other in the frame. The height H for which the principal ray/optical axis of the camera 120 will have elevation above the ground field 100 of 20 degrees or more is sufficient. The tracking units 200A-D, in contrast, are located at the level of game field (half of the player's height or up to 6-8 feet above the ground) in order to simplify the design of motorized mirror 209 (only one axis is needed in such configuration). In some example embodiments, the system is complemented with a LIDAR sensor 130 that is using a known laser technology for distance measurements (rays 131) and is placed at the same height as tracking units 200A-D (about half of the player's height) to provide instant estimates of the position of players 101A-D on the game field 110.

Figure 2:
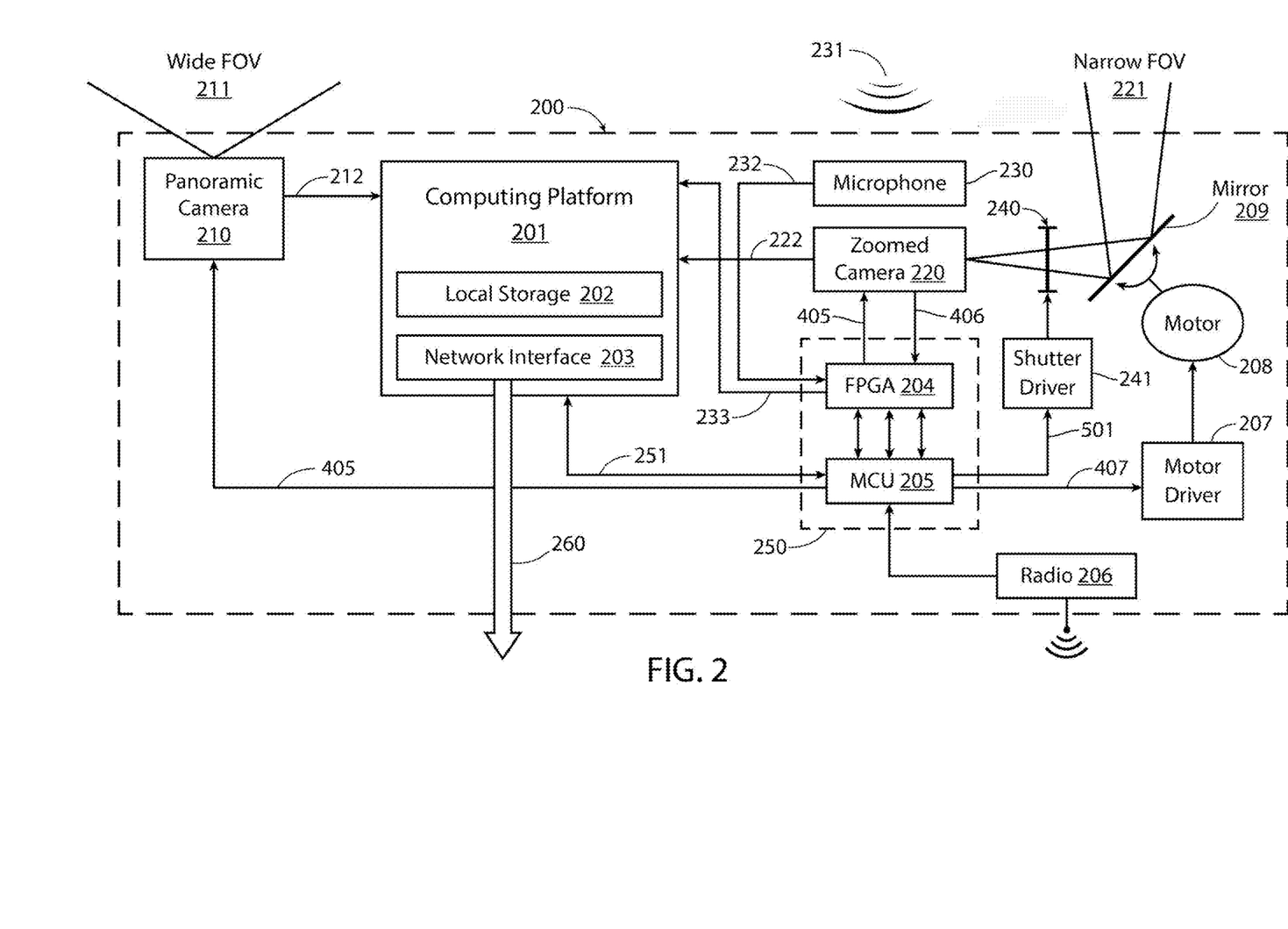
FIG. 2 depicts a high-level system diagram of an exemplary embodiment of the tracking unit.

As the game progresses, the position of players 101A-D and the ball 150 changes. Each tracking unit 200 can detect in real time when the object of interest that it is currently tracking is about to go out of the field of view 221 (45 degrees or less, horizontally) of zoomed camera 220 (FIG. 2). This information is used as a feedback to motorized mirror 209 placed in front of the zoomed camera 220. Its position is constantly adjusted to keep the object of interest within the field of view 221 of zoomed camera 220. To detect the object of interest in the first place, each tracking unit is equipped with panoramic camera 210 which has the field of view 211 such that it contains any possible field of view 221 of the zoomed camera 220.

By design, each tracking unit 200 is a self-sufficient unit and can decide independently on which object of interest to follow. However, in some embodiments, the tracking units are connected using wired (e.g., Ethernet) or wireless (e.g., Wi-Fi) network connection allowing them to share the information about objects that are within their reach and make a more optimal joint decision on which objects should be tracked by which unit. This helps to avoid situations like the one shown on FIG. 1 where there are four players 101A-D and four tracking units 200A-D but player 101C (with the ball 150 next to it) is not an object of interest for any unit. It is still being tracked by panoramic cameras but is not in the field of view of any zoomed camera that could provide a much higher level of detail for that object. It is possible though, that the decision is made to intentionally ignore this player because it is not an interesting (that is, "active") player of the game at a given moment and focus resources on tracking in detail other players (e.g., 101A). Different perspectives of units 200A and 200C are then used to reconstruct a 3D information about the player, such as a 3D skeleton representation for that player.

FIG. 2 is showing an exemplary embodiment of the tracking unit 200. Its main component is a computing platform 201. Computing platform is an embedded platform with typical architecture comprising of Central Processing Unit (CPU), Graphical Processing Unit (GPU), Random Access Memory (RAM) and peripheral devices/interfaces. In some embodiments, the computing platform has shared memory between CPU and GPU (e.g., NVIDIA Jetson). Two important peripheral devices are local storage 202 and network interface 203. Video data 212 and 222 coming from panoramic 210 and zoomed 220 cameras requires high bandwidth due to the high-speed nature of sports and, therefore, a high frame rate of the cameras. In one example embodiment, video data is compressed by computing platform 201 and stored in relatively slow local storage 202 such as a Hard Disk Drive (HDD). In another example embodiment, a faster local storage, such as a Solid State Drive (SSD) with PCI-Express interface, is used to store video data without compression and with additional metadata (e. g., a precise timestamp or position of the mirror 209 for each frame). In yet another example embodiment, both types of storage are used and computing platform 201 is compressing and transferring video data from fast to slow storage on demand. Audio data 233 does not require compression due to its low data rate compared to the video data.

Sound is a second most actively involved modality when watching a sports game. Important game events, such as when the ball 150 is hit or caught, are often accompanied by a distinct (loud) sound 231. In air, sound covers 1 m in about 3 ms, so it is possible to localize the sound source by using a microphone array with standard sampling frequency (e.g., 48 KHz) and measuring the time delays in sound registration by different microphones. This is a known method that requires a precise synchronization of the microphones and some example embodiments consistent with the present description include a (wireless) synchronization technique for tracking units with error less than one period of the sound sampling frequency.

Each example tracking unit 200 is equipped with a microphone 230 and radio module 206. Radio module 206 is passively receiving a timestamp from orchestrator radio module 305 (FIG. 1) placed somewhere around the game field 110. Because the speed of the radio waves is almost a million times greater than the one of the sound, it is assumed with negligible errors that each radio module 206 receives the timestamp simultaneously. This timestamp is used by microprocessing module 250 to synchronize all the signals sent out to different components of the tracking unit 200. In particular, the timestamp received from the radio module 206 is embedded into the original audio data stream 232 and modified audio data 233 is then sent to computing platform 201. In one example embodiment, microphone 230 is a mono microphone and timestamp is used to form a second channel of stereo audio data stream 233 that is sent to computing platform 201 via corresponding interface, such as (but not limited to) a digital I2S interface. In another example embodiment, the timestamp is embedded into a stereo audio stream 232 in place of unused least significant bits of each sample, improving in this way the synchronization accuracy by a factor of two without degrading the sound quality. The embedded timestamp is then used to adjust for a slight sampling rate mismatch (due to the manufacturing errors, more details in the description to FIG. 4A) in audio data captured by different units 200A-D by adding/removing a few audio samples once in a while to match the sampling frequencies as close as possible.

In some example embodiments, a synchronization signal, such as hardware trigger 405 or camera exposure signal 406, is interleaved with audio data bit stream to further increase the synchronization accuracy between audio and video data streams. It provides superior synchronization accuracy but requires an extra processing of the data stream after it was received by computing platform 201. Cameras 210 and 220 have a native support of hardware trigger 405 which is synchronized among different tracking units using timestamp received from radio module 206 (described in detail on FIG. 4A). In example embodiments using a wired network interface 203, wireless synchronization technique of some example embodiments consistent with the present description can be substituted with Precision Time Protocol (PTP).

Example microprocessing module 250 comprises of two major components. First is a microcontroller unit 205 executing a program that is responsible for communication between computing platform 201, radio module 206, shutter driver 241 and motor driver 207. It is also performing the synchronization tasks. Second is a Field Programmable Gate Array (FPGA) 204 responsible for connectivity between the modules and implements the logic necessary to embed the synchronization signals into the audio data stream 232. In some example embodiments, FPGA 204 is replaced with a Printable Circuit Board (PCB) and standard logic components. In other example embodiments, FPGA 204 and microcontroller unit 205 are combined into a single System on a Chip (SoC) such as Xilinx Zynq. Connection 251 between microprocessing module 250 and computing platform 201 is established using a standard UART, USB or Ethernet protocol.

Example motor driver 207 is a hardware module generating signals that drive the motor 208 in response to the motor trigger 407 issued by microcontroller unit 205. The motor trigger 407 is synchronized with camera exposure 406 in such a way that the motor 208 rotates the mirror 209 during the time between the consecutive frame exposures (FIG. 4B). Mirror 208 needs to remain still while zoomed camera 220 is exposing the frame to avoid motion blur. In an exemplary embodiment, motor 208 is a stepper motor and torque transmission is implemented using gears. This reduces oscillations and mirror settling time after the step was made compared to, for example, belt transmission.

Example shutter 240 is used to take complex frames with zoomed camera 220 as illustrated on FIG. Operation of the shutter 240 is synchronized with camera exposure signal 406 so that the camera sensor is exposed multiple times (with a time delay in between) during the formation of a single frame. This results in fast moving objects, such as the ball 150, being captured multiple times in a single frame. By measuring the distance that object covered between consecutive activations of the shutter 240 with known period (signal 501), one can calculate the speed of the fast-moving object based on a single frame.

Figure 3:
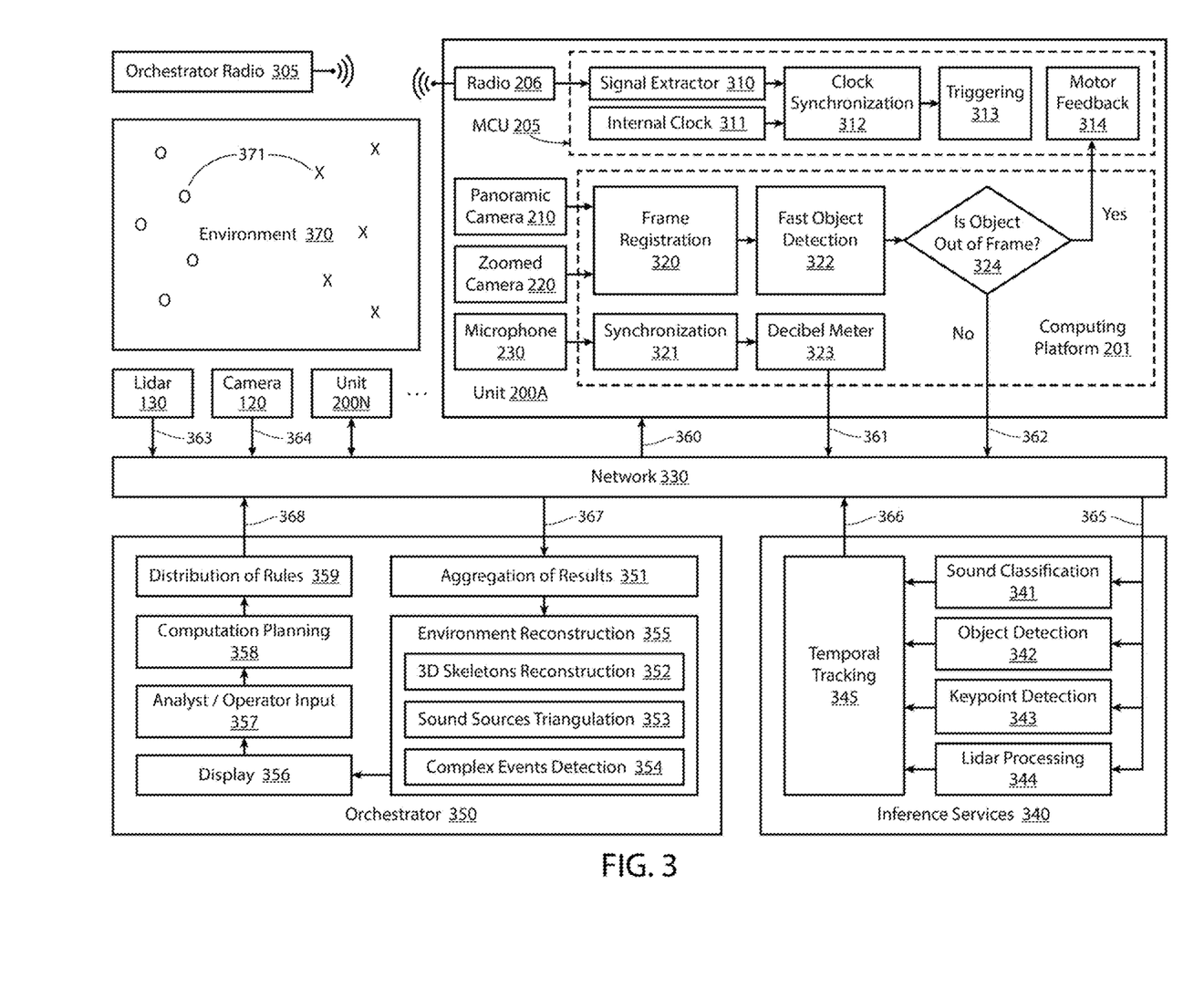
FIG. 3 is a schematic of exemplary data acquisition and processing elements illustrating the possible software architecture of the system.

FIG. 3 shows an illustrative embodiment of software architecture implementing the proposed tracking method. It can be subdivided into parts that are tied to and executed by a particular component of the system (e. g. computing platform 201) and platform independent blocks, such as inference services 340 and orchestrator 350. The latter can also be executed on computing platform 201 of selected tracking units 200 as well as on a dedicated server. Communication between all blocks may be established via network 330 and standard TCP/UDP protocols. Computing platform 201 has a significant computing power and network-based architecture enables dynamic load balancing between the tracking units and eliminates the need for (but does not prevent the use of) dedicated server. The following is a detailed description of each example software block.

The most tied to a particular component is a program executed by microcontroller unit 205. It is driven by internal clock 311 and receives timestamps from radio module 206 distributed by orchestrator radio 305. Internal clock 311 and timestamp decoded by signal extractor 310 are provided to clock synchronization module 312. Synchronized clock is then subdivided by triggering module 313 to desired frame rate for panoramic 210 and zoomed 220 cameras.

When computing platform 201 receives a frame form panoramic 210 and zoomed 220 cameras, they need to be registered with respect to each other. Frame registration 320 is a process of determining the exact position of frame taken with zoomed camera 220 within the frame from panoramic camera 210. One important property of example embodiments consistent with the present description is combining two (zoomed and panoramic) cameras is that registration error for each frame remains constant over time. Panoramic frame contains some fixed distortions that are calibrated out once and position of the zoomed frame is refined starting from an estimate based on the position of the mirror 209. The position of the mirror 209 is not precisely reproducible but the registration error of zoomed frame is limited by the same value for each frame. Without panoramic camera, zoomed frame must be registered with respect to previous zoomed frame to calculate the absolute position and the error accumulates over time. Some example embodiments consistent with the present description have a similarity with human eye which also has a relatively low resolution of peripheral vision (panoramic camera) and sharp central (fovea) vision (zoomed camera).

Once registered, the frames are processed by fast object detection algorithm 322 to determine whether the object of interest is out of frame for zoomed camera 220. If the answer is positive (Yes) then a message is sent via connection 251 to motor feedback logic 314 residing in microcontroller unit 205 to adjust the position of the mirror 209 so that the object of interest is within a field of view of zoomed camera 220. If the answer is negative (No) then the frames are sent (362) to inference services 340 for further processing. Frames provided by camera 120 are sent to inference services 340 directly.

Second pipeline executed on computing platform 201 is the one processing sound data. Audio data stream 233 received by computing platform 201 from microphone 230 is processed by synchronization block 321 extracting the synchronization signal and aligning audio samples to video stream. Synchronized audio is then analyzed by decibel meter 323 to detect any loud events and send results directly to orchestrator 350 for sound source triangulation 353. Audio data is also sent (361) to inference services 340 for sound classification 341. In some example embodiments, a tracking unit 200 contains an array of multiple microphones 230, thus, enabling localization of sound sources using beamforming techniques.

Inference services 340 are a collection of primarily deep convolutional neural network algorithms for detection and localization of various objects and sound patterns in data streams. Sound classification 341 executed for sliding window over the audio stream results in a vector of probabilities for each sound class. The output of object detection 342 is a set of bounding boxes for objects detected in a frame (e.g., a player or a ball) and classified with a confidence level greater than a given threshold. Keypoint detection 343 outputs a list of keypoints and their locations for each detected object including and not limited to a tip of a baseball bat or joints of player's body such as a knee, elbow etc. LIDAR processing 344 is performing segmentation of point cloud 363 received from LIDAR sensor 130. Points corresponding to objects of interest provide an independent estimate of their position. The output of each detector/classifier computed for individual frames is then sent to temporal tracking 345 for filtering and formation of temporary consistent trajectories for detected objects.

Orchestrator 350 is a software block responsible for aggregation of the results 351 and high-level reconstruction of the environment 370 as well as interaction with system operator. Environment reconstruction 355 includes and is not limited to 3D skeletons reconstruction 352, sound sources triangulation 353 and complex events detection 354. In the example embodiment, 3D skeleton reconstruction 352 can be performed even if the player is tracked by a single tracking unit 200 when standard triangulation techniques are unavailable. In this scenario, a dedicated neural network is trained on demand for a given viewing direction as the position of the player and tracking unit are known. Also, in some example embodiments, the tracking unit 200 contains two or more zoomed cameras so that stereo reconstruction techniques can be used as well.

Tracking results are then sent to display 356. In one embodiment, the display 356 is a display of dedicated computer executing the orchestrator software block 350. In another example embodiment, the display is embedded into tracking unit 200 and orchestrator software block is executed on computing platform 201 of that tracking unit. In yet another example embodiment, the display 356 is a web page that can be displayed on any device (including mobile devices) that is connected to network 330 directly or via Internet.

There are two ways to affect the operation of the tracking system. First is a direct control of data flow in the system through means of system operator such as enabling/disabling different components of the system, defining which platform is executing inference services 340 for each tracking unit 200 etc. Second is an analyst input Analyst is a person (e.g., team coach or sports commentator) who defines targets, triggers and other rules of how the system should perform in different game contexts. In baseball, for example, tracking units might be focused on pitcher before he throws the ball and on outfielders after it was hit by a batter, completely ignoring the pitcher now. Computation planning 358 is a stage when analyst input is considered, and a set of rules is defied for each tracking unit 200 which are then distributed (359) to the units via network 330. In one example embodiment, a possible rule for the tracking unit 200A is to capture frame with phase offset with respect to the other tracking unit 200C. With two tracking units following the same object of interest (player 101A on FIG. 1) and phase offset 50% the effective frame rate at with the object is being recorded doubles. Timing characteristics of the system are illustrated in more details on FIGS. 4A and 4B.

Figure 4A:
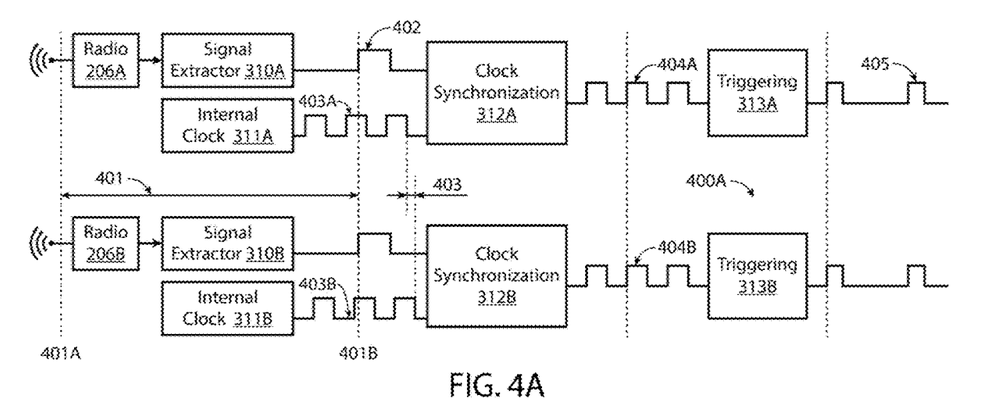
FIG. 4A represents a timing diagram which illustrates the main steps of synchronization of the different tracking units.
Figure 4B:
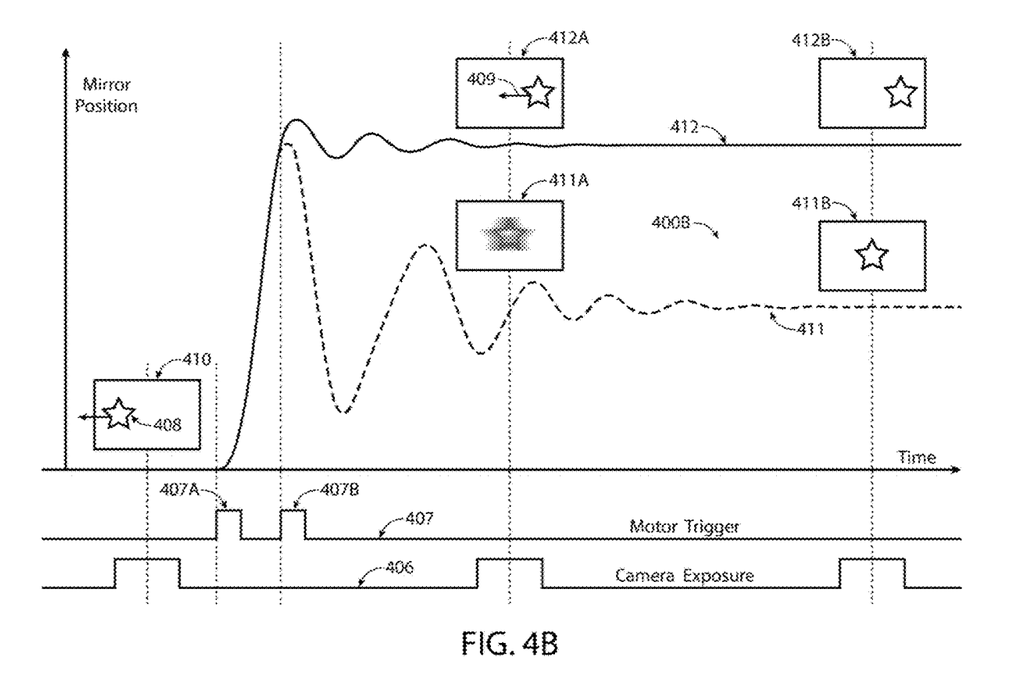
FIG. 4B depicts a transition of mirror from one still position to another using single- and double-step techniques.

With reference to FIG. 4A, there is depicted a timing diagram of software block executed by microcontroller unit 205 and responsible for synchronization of tracking units 200. As described earlier, radio modules 206A and 206B of two different tracking units 200A and 200B are receiving a timestamp from orchestrator radio 305 practically simultaneously due to the large speed of radio wave propagation in air (300,000 km/sec). Signal extractor 310 communicates with radio module 206, retrieves the timestamp and issues a synchronization signal 402. Signal extractor 310 is designed in such a way that the time delay 401 between the moment 401A when radio module 206 received the timestamp and the moment 401B when synchronization signal 402 was issued is fixed and deterministic. Note that the fixed and deterministic time delay 401 helps to reduce the jitter of synchronized clocks 404A-B and, hence, improves accuracy but, in a long run, it is not mandatory for synchronizing the clocks 311A-B that drift with respect to each other due to the slight frequency mismatch (see below). Each microcontroller unit 205 in tracking unit 200 has an internal clock 311 that is driving the execution of its program. Due to manufacturing errors, there is a difference in frequencies of internal clocks 311A and 311B causing a phase shift 403 between their waveforms 403A and 403B. The phase shift 403 is either increasing or decreasing over time with constant speed depending on how much frequency of internal clock 311A is greater or smaller than the frequency of internal clock 311B. Clock synchronization 312 is done by aligning the phase of internal clock 311 with synchronization signal 402. In an exemplary embodiment, implementation of clock synchronization 312 is based on an internal hardware timer of microcontroller unit 205 with the highest CPU interrupt priority. Clocks 404A and 404B are synchronized upon arrival of synchronization signal 402 but keep drifting with respect to each other in between. In some example embodiments, a high precision hardware timer is used, and its period is adjusted based on the measured time interval between consecutive synchronization signals 402 to reduce the speed of phase drift between clocks 404A and 404B. Finally, the synchronized clock 404 is subdivided by triggering module 313 to frame rate frequency and trigger 405 is sent to the camera.

FIG. 4B depicts a transition curve for single (411) and double (412) step performed by a motor 208 with waveform of motor trigger 407 and camera exposure 406 signals below. Mirror 209 is placed in front of the zoomed camera 220 and coupled to the motor 208. Because of finite exposure used by zoomed camera 220, any movement of mirror 209 during the frame exposure will cause it to be blurred (in given example, horizontally). Therefore, any change of field of view 221 of zoomed camera 220 is done in between the frame exposures and the mirror 209 must be still during the actual exposure. Example embodiments consistent with the present description introduce a technique for increasing the frame rate of zoomed camera 220 while increasing the speed at which its field of view 221 is being adjusted at the same time.

Frame 410 is the last frame taken by zoomed camera 220 before object of interest 408 moving in direction 409 is about to get out of its field of view 221. Shortly after, microcontroller unit 205 receives a feedback from computing platform 201 and issues a motor trigger 407A. Motor driver 207 reacts to the motor trigger 407A and configures a new position 411. Because forces pulling the mirror 209 to the new position 411 are symmetric with respect to that position, mirror 209 is oscillating few times around new position 411 before its kinetic energy is dissipated due to friction and it stops. This causes the following frame 411A to be blurred significantly, reducing the effective frame rate by a factor of two. An alternative example embodiment consistent with the present description is to issue a second motor trigger 407B when the mirror 209 is at amplitude position close to the position 412 of the second step. Motor driver 207 quickly configures position 412 and mirror oscillations attenuate faster because of the smaller initial amplitude. The consecutive frame 412A is not blurred and the field of view 221 of zoomed camera 220 is adjusted by double the amount of a single step. Presented technique can be extended for triple and multiple steps as well as multiple axes, enabling optical tracking of very fast (100 mph+) moving objects such as a baseball ball during pitch.

Figure 5:
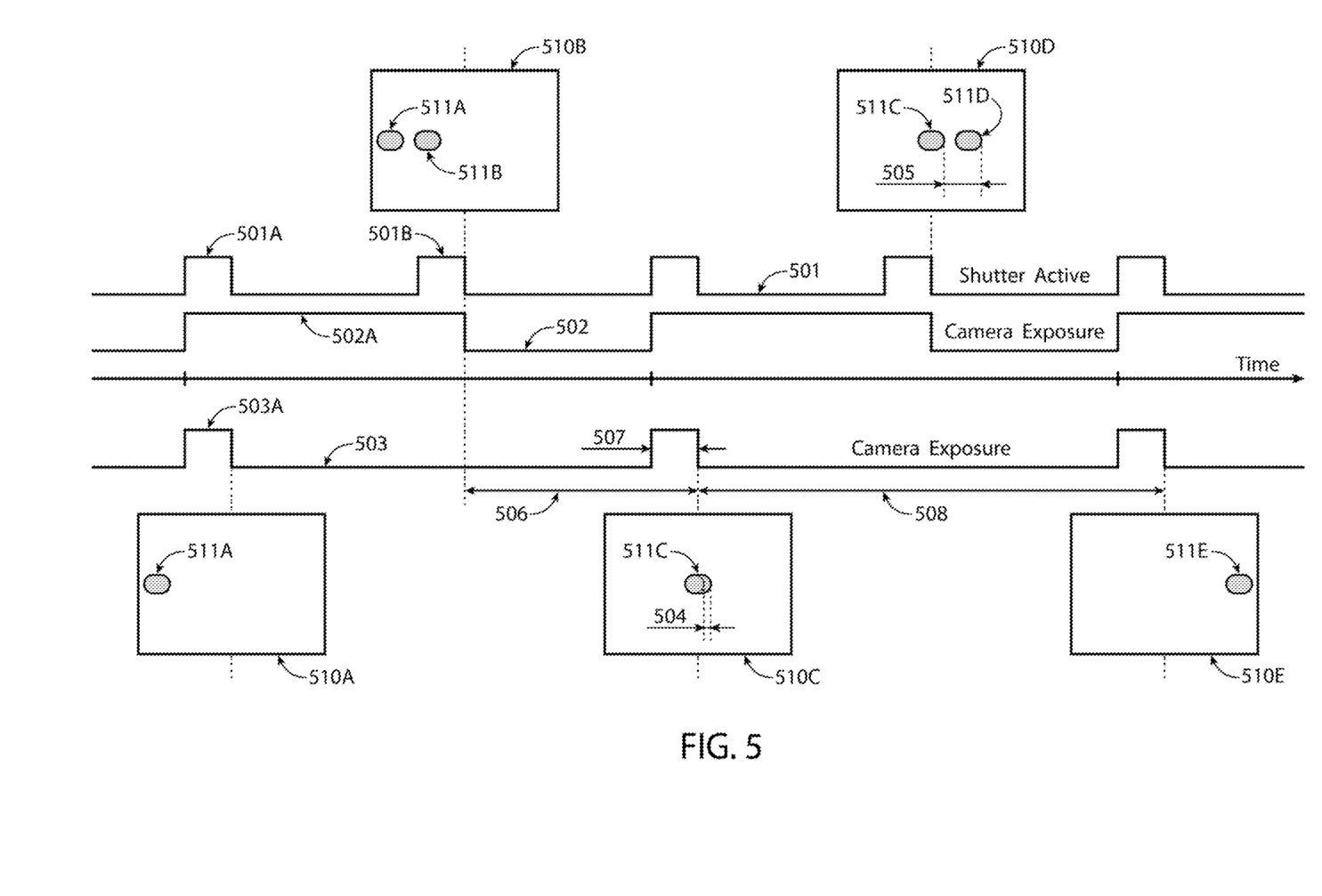
FIG. 5 illustrates formation of the frames taken using secondary shutter for speed measurements.

FIG. 5 illustrates the technique of measuring the speed of fast-moving objects based on a single frame. Below the time axis, there is depicted a camera exposure signal 503 of standard video acquisition with period 508 between consecutive frames 510A, 510C and 510E. Fast moving object (e.g., the ball 150) is captured in positions 511A, 511C and 511E correspondingly and exposure duration 507 is defining the amount of motion blur 504 for that object, which is typically small (less than object size) for high speed cameras with short exposure time (less than 1 ms). Above the time axis, there is illustrated a technique of an example embodiment consistent with the present description in which a second shutter 240 in placed in front of the zoomed camera 220. Controlled by shutter driver 241, it is open when shutter signal 501 is active. In an exemplary embodiment, there are two activations 501A and 501B of the shutter 240 per each frame exposure 502A. The period 506 between shutter activations is half the frame acquisition period 508 and initial exposure duration 507 is extended by this amount too. The net effect achieved is that the sensor is exposed twice during the formation of frame 510B with time delay equal to shutter activation period 506 resulting in two images 511A and 511B of the fast-moving object in that frame (position of 511B is in the middle between 511A and 511C in this example). Because shutter activation period 506 is significantly greater than initial exposure duration 507 (by a factor of 10 typically) the distance 505 between two images is greater than motion blur 504 (at least by one object size). The distance 505 divided by shutter activation period 506 is the speed of the fast-moving object obtained from a single frame 510B. In other example embodiments, there are three or more activations of the shutter per single frame exposure with different timing, but the common property is that multiple images of the fast-moving object in a single frame are separated by at least the object size so that they are distinguishable for speed measurements. Another challenge on number of shutter activations per frame exposure is that the multiple images of fast-moving objects are semi-transparent with transparency of single image equal to one over the number of images, making them harder to detect.

The example system described above satisfies the predetermined objectives and makes it possible, among others, to automatically determine the position of sparsely distributed players and of the ball on a large game field. Without using any special markers, the system provides, in real time (several times per second), full skeleton representation for each player, location and timing of sound events and high-level context of the game. The results are displayed in multiple forms and user can provide input to adjust the tracking strategy.

While the example embodiments have been described in terms of its applicability to team sports, they will be clear to those of ordinary skill in the art how to apply it to other large-scale environments. Portions of the example system may also be used for tracking of individual objects and in other domains. For instance, a combination of panoramic and zoomed cameras imitates the working principle of the human eye and it will be obvious to those of ordinary skill in the art to apply the invention to robotics. In addition, many modifications may be made to adapt the synchronization techniques or other particular components without departing from the spirit and scope of the present invention. Therefore, it is understood that the present invention is not limited to any particular embodiments disclosed to show and describe the example embodiments.

Embodiments consistent with the present invention may be implemented on an example system that may perform one or more of the processes described, and/or store information used and/or generated by such processes. The exemplary system includes one or more processors, one or more input/output interface units, one or more storage devices, and one or more system buses and/or networks for facilitating the communication of information among the coupled elements. One or more input devices and one or more output devices may be coupled with the one or more input/output interfaces. The one or more processors may execute machine-executable instructions (e.g., Python, C, C++, etc.) to effect one or more aspects of the example embodiments consistent with the present description. At least a portion of the machine executable instructions may be stored (temporarily or more permanently) on the one or more storage devices and/or may be received from an external source via one or more input interface units. The machine executable instructions may be stored as various software modules, each module performing one or more operations. Functional software modules are examples of components of the invention.

In some embodiments consistent with the present invention, the processors may be one or more microprocessors and/or ASICs. The bus may include a system bus. The storage devices may include system memory, such as read only memory (ROM) and/or random access memory (RAM). The storage devices may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present description may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present description may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present description might be implemented in hardware, such as one or more field programmable gate arrays ("FPGA"s), one or more integrated circuits such as ASICs, one or more network processors, etc. Alternatively, or in addition, embodiments consistent with the present description might be implemented as stored program instructions executed by a processor. Such hardware and/or software might be provided in a laptop computer, desktop computer, a server, a tablet computer, a mobile phone, or any device that has computing capabilities and that can perform the foregoing method(s).

§ 4.1 REFINEMENTS, EXTENSIONS, AND/OR ALTERNATIVES

Some parts of the example system (mainly sound and synchronization related at a moment) may be directly included into the REIP framework described in Appendix A. The REIP framework described in Appendix A (incorporated herein as a part of the description) is a dependency of the a prototype's software, which cannot be executed without the framework. It makes sense to organize the software in this way so that it is more reusable and easily extendable. For instance, software blocks for LIDAR sensor 130 may be built on top of the REIP framework. Thus, the REIP framework described in Appendix A may be thought of as the arrows in FIG. 3 that connect different software blocks (because that is its main function—to define software blocks API and manage data that is being passed between them).

Appendix B (incorporated herein as a part of the description) includes prototype software modules that may be used to implement features corresponding to dotted region Computing Platform 201 (inside Unit 200A), as well as hardware and/or firmware that may be used to implement features corresponding to dotted region MCU 205 (and Orchestrator Radio 305) on FIG. 3.

§ 4.2 CONCLUSIONS

As should be appreciated from the foregoing, example embodiments consistent with the present description may be used to provide a tracking system that can track a large physical area at high resolution (that is, being able to resolve detailed movement of people and objects, such as that required to compute skeletons), in contrast to existing tracking systems when applied to large scale environments, such as a sports field.

What is claimed is:

1. A system for tracking sparse objects in an environment, the system comprising:
  a) a plurality of panoramic cameras, each having a wide field of view;
  b) a plurality of zoom cameras, each having a narrow field of view which is less than the wide field of view;
  c) a plurality of adjustment mechanisms for adjusting, for each of the plurality of zoom cameras, the narrow field of view; and
  d) a controller configured to
    1) Receive image information from the plurality of panoramic cameras;
    2) Determine a position of at least one of the sparse objects within the environment; and
    3) Output a control signal to control the adjustment mechanisms so that at least one of the sparse objects in the environment remains within the narrow field of view of at least one of the plurality of zoom cameras,
  wherein each of the plurality of adjustment mechanisms is a mirror located within an optical path between at least one of the sparse objects and an imager of a respective one of the zoom cameras,
  wherein the plurality of panoramic cameras, the plurality of zoom cameras and the plurality of mirrors are distributed in a plurality of units, each of the plurality of units including one of the plurality of panoramic cameras, at least one of the plurality of zoom cameras and at least one of the plurality of mirrors,
  wherein each of the mirrors is controlled by a motor, and
  wherein each of the motors controlling the mirrors is driven between exposures of its associated zoom camera.

2. The system of claim 1 wherein the controller is, at least in part,
  distributed among the plurality of units as a plurality of local computing platforms, and wherein each of the plurality of units further includes at least one of the plurality of local computing platforms.

3. The system of claim 1 wherein each of the motors is a stepper motor and is driven, between exposures of its associated zoom camera, by at least two accurately tinned drive pulses so that the oscillations of the mirror when settling in a final position are reduced and the speed of position adjustment is increased.

4. The system of claim 1 wherein the sparse objects include people and a ball, and wherein the environment is a playing field, rink, or court.

5. The system of claim 4
  wherein each of the units is positioned at a height between a height of the playing field, rink, or court, and 3 to 8 feet above the playing field, rink, or court.

6. The system of claim 2, further comprising:
  e) a sparse object position capturing means for determining the position of at least one of the sparse objects within the playing field or court,
  wherein each of the units includes a transmitter and receiver, and
  wherein the controller further includes a centralized portion including
    1) A receiver for receiving
      sparse object positions from the sparse object position capturing means, and
      image data captured by at least some of the plurality of panoramic cameras and the plurality of zoom cameras,
    2) an orchestration module for determining for each of the plurality of units, at least one of the sparse objects to track using (i) the received sparse object positions from the sparse object position capturing means, and (ii) the received image data captured by at least some of the plurality of panoramic cameras and the plurality of zoom cameras, and 3) a transmitter to transmit, to each of the plurality of the units, the determined at least one of the sparse objects to track.

7. The system of claim 6 wherein the transmitter and receiver included in each of the units are wireless, and
wherein the transmitter and receiver of the centralized portion of the controller are wireless.

8. The system of claim 6 wherein the sparse object position capturing means is one of (A) a LI DAR unit, and/or (B) an elevated camera, and
wherein the sparse object position capturing means covers the entire playing field or court.

9. The system of claim 1 wherein the wide angle field of view is at least 45 degrees, horizontally.

10. The system of claim 1 wherein the narrow view field of view is no more than 45 degrees, horizontally.

11. The system of claim 1 wherein the plurality of panoramic cameras and the plurality of zoom cameras each have an internal clock operating at a first frequency, and wherein the controller is further configured to synchronize the plurality of panoramic cameras and the plurality of zoom cameras by
receiving, by a radio module in each of the plurality of panoramic cameras and the plurality of zoom cameras, a common radio synchronization signal;
extracting, bya signal extractor in each of the plurality of panoramic cameras and the plurality of zoom cameras, the common radio synchronization signal received; and
synchronizing each of the internal clocks using the common radio synchronization signal received and extracted, thereby reducing the drift of the clock.

12. The system of claim 11 wherein, in each of the plurality of panoramic cameras and the plurality of zoom cameras, the radio module and the signal extractor collectively have a deterministic, fixed, time delay which reduces jitter of the synchronized clock.

13. The system of claim 11, wherein the controller is further configured to synchronize the plurality of panoramic cameras and the plurality of zoom cameras by
triggering of image capture in each of the plurality of panoramic cameras and the plurality of zoom cameras based on the synchronized internal clocks, wherein a high frame rate is used for zoom cameras and lower frame rate is used for the panoramic cameras.

14. The system of claim 11, further comprising:
a microphone in each of the plurality of panoramic cameras and the plurality of zoom cameras, wherein the plurality of panoramic cameras and the plurality of zoom cameras are configured to capture audio, generate streams of audio data, and embed the synchronized internal clocks into the generated streams of audio data to generate modified streams of audio data.

15. The system of claim 14, wherein each of the synchronized internal clocks are embedded into a respective one of the generated streams of audio data either (A) as a completely separate channel of the respective one of the generated streams of audio data, or (B) as a least significant bit in a channel of the respective one of the generated streams of audio data.

16. The system of claim 15, wherein the controller is further configured to synchronize the plurality of panoramic cameras and the plurality of zoom cameras by
triangulating a position of an origin of a sound in an environment using the streams of audio data captured by the microphones and the synchronized internal clocks embedded in the modified streams of audio data.

17. A computer-implemented method for tracking sparse objects in an environment, the computer-implemented method comprising:
a) receiving image information from a plurality of panoramic cameras, each having a wide field of view;
b) determining a position of at least one of the sparse objects within the environment; and
c) outputting a control signal to control one or more adjustment mechanisms for adjusting, for one or more of a plurality of zoom cameras, each having a narrow field of view which is less than the wide field of view, the narrow field of view so that at least one of the sparse objects in the environment remains within the narrow field of view of one or more of the plurality of zoom cameras, wherein each of the one or more adjustment mechanisms is a mirror located within an optical path between at least one of the objects and an imager of a respective one of the zoom cameras,
wherein the plurality of panoramic cameras, the plurality of zoom cameras and the plurality of mirrors are distributed in a plurality of units, each of the plurality of units including one of the plurality of panoramic cameras, at least one of the plurality of zoom cameras and at least one of the plurality of mirrors,
wherein each of the mirrors is controlled by a motor, and
wherein each of the motors controlling the mirrors is driven between exposures of its associated zoom camera.

18. The system of claim 1 wherein each of the mirrors is controlled by a motor, and
wherein each of the motors controlling the mirrors is only driven between exposures of its associated zoom camera whereby oscillations of the mirror and resulting blur during each of the exposures is avoided.

19. The system of claim 1, wherein, for each of the plurality of zoom cameras, a position of the mirror is adjusted so that at least one of the sparse objects is within a field of view of the imager of the zoomed camera.

* * * * *